Patented Nov. 13, 1951

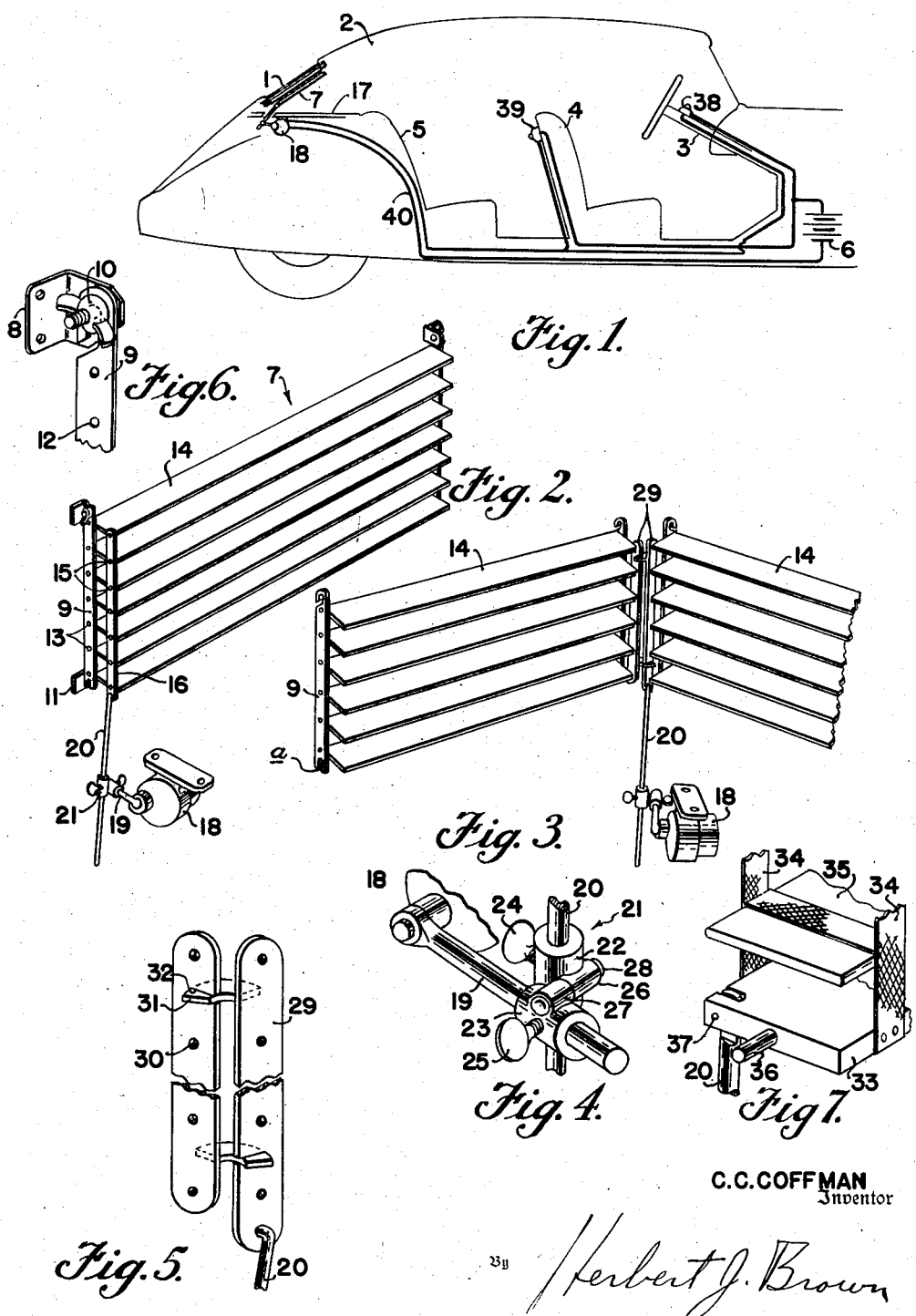

2,574,729

UNITED STATES PATENT OFFICE 2,574,729

REMOTE-CONTROL BLIND OPERATOR FOR MOTOR VEHICLES

Clifford C. Coffman, Dallas, Tex.

Application July 15, 1949, Serial No. 104,853

2 Claims. (Cl. 268—96)

This invention relates to blinds for automobiles, and has particular reference to a means for opening and closing slatted blinds positioned inwardly and across the rear automobile windows.

An object of the invention is to provide a simplified construction for actuating slatted blinds in automobiles.

Another object of the invention is to provide an inconspicuous arrangement whereby the prime mover for actuating slatted blinds in automobiles is removed from the sight of the passengers.

Other objects of the invention reside in simplicity of construction and economy of manufacture in a blind construction referred to.

Other objects of the invention will become apparent from the following description and the accompanying drawing, wherein:

Figure 1 is a side schematic view of an automobile, and showing the present invention installed therein.

Figure 2 is a perspective view of a slatted blind for attachment across the rear window of an automobile, and showing the preferred type of prime mover for actuating the same connected thereto.

Figure 3 is a perspective view similar to Figure 2, but showing a blind with divided slats for fitting the inside of a curved rear automobile window.

Figure 4 is a perspective view of a coupling for connecting the actuating rod with the prime mover.

Figure 5 is a perspective view of the slat actuating mechanism used in conjunction with the form of the invention illustrated in Figure 2.

Figure 6 is a perspective view of a bracket connected with the upper ends of a pair of supports for attaching the blind in position relative to the automobile window.

Figure 7 is a perspective view of the lower end and corner of a conventional blind, and showing how the present invention may be employed therewith instead of the slatted or louvered blinds heretofore referred to.

The numeral 1 indicates the slanted rear window of an automobile 2 as illustrated in Figure 1. The automobile 2 includes the usual steering column 3, front and rear seats 4 and 5, and storage battery 6. The blind illustrated in Figure 2, and generally designated by the numeral 7, is comprised of a pair of brackets 8 secured to opposite upper corners of the window 1. Hinged supports 9 are secured to the brackets 8 by means of wing nuts 10, and which supports extend downwardly parallel with the sides of said window. The lower ends of the hinged supports are detachably secured by slats a to other brackets 11 secured to the lower corners of the window. Spaced holes 12 are formed in each of the supports 9 to receive the trunnions 13 of the parallel horizontal slats 14 of the blind 7. In the form of the invention illustrated in Figure 2, the trunnions 13 support the slats 14 at their ends and at the sides thereof, whereas, other similar trunnions 15 are correspondingly provided on the opposite sides and at the ends of the slats 14. The last referred to trunnions 15 are connected with each other by pivotal engagement with an actuating bar 16 located at one end of said slats only and spaced from the first said trunnions 13.

Beneath the rear deck 17 behind the automobile seat 5, there is an electric motor 18 having a projecting oscillating arm 19. An actuating rod 20, pivotally connected at its upper end with the lower end of the actuated bar 16, is connected by means of a pivoted coupling 21 with the oscillating arm 19. As particularly shown in Figure 4, the coupling 21 includes separate sleeves 22 and 23 for slidably receiving, respectively, the actuating rod 20 and the oscillating arm 19. Thumb screws 24 and 25 engage the respective sleeves 22 and 23 on the rod 20 and on the arm 19. Transverse projections 26 and 27 on each sleeve 22 and 23 are joined, end to end, by means of a pin 28 passing therethrough.

The form of the invention illustrated in Figure 3 is substantially the same as the form of the invention illustrated in Figure 2, but differs therefrom in that the slats 14 are divided at their centers so as to accommodate a rear window 1 having a curved surface. In place of the actuating bar 16 at one end of the blind 7, as previously described, there are separate actuating bars 29 at the opposing ends of the divided slats 14. Openings 30 in the bars 29 engage trunnions 15 in the slats 14 in the manner previously described. Spaced arcuate projections 31 are provided on corresponding surfaces of the actuating bars 29 and are disposed to the sides thereof to slidably engage slots 32 in the respective and adjoining actuating bars 29. The previously described rod 20 is pivotally connected with one of the bars 29 so as to operate the slats 14 by means of the motor 18.

A conventional venetian blind, as illustrated in Figure 6, may be installed in the automobile 2 in the conventional manner, and which blind includes a tilt bar 33, tapes 34, and slats 35 supported by said tapes. Trunnions 36 are engaged in brackets (not shown) in the conventional manner. The actuating rod 20 is pivotally secured to one side of the tilt bar 33 by means of a pin 37 passing through said tilt bar and through said actuating bar.

The motor 18 may be operated from a switch 38 on the steering column 3 or by another switch 39 conveniently located for use by the occupants of the rear seat 5. Suitable wires 40 connect the switches 38 and 39 and motor 18 with the automobile battery 6. While I have shown preferred forms of my invention, it will be understood that various arrangements of apparatus and construction may be made without departing from the spirit of my invention as defined in the following claims.

What is claimed is:

1. A remote control operator for a louver type blind mounted in the rear window of an automobile having a rear deck where said blind is comprised of pivotally mounted horizontal slats hingedly connected with each other for operation in unison, said remote control operator comprising: a reversible motor mounted beneath said rear deck and within said automobile beneath said louver type blind, a laterally projecting oscillatable arm supported on and operated by said motor, a substantially vertical actuating rod extending through said rear deck and pivotally connected at its upper end to at least one of said horizontal slats outwardly of the axial center therof, a hinged bracket having openings through each of its hinged parts and arranged substantially perpendicular to each other for slidably and adjustably securing said arm and said rod in the respective said openings, means energizing said motor and switch means located convenient to the driver's seat of said automobile for reversibly controlling said motor.

2. A remote control operator for a louver type blind mounted in the rear window of an automobile having a rear deck where said blind is comprised of substantially vertical fabric ladder tapes arranged parallel with respect to each other and having horizontal slats supported therein, together with a horizontal tilt bar secured to the lower ends of said tapes and means supporting the upper ends of said tapes in a manner so as to permit relative movement of the opposite sides of the respective said tapes, said remote control operator comprising: a reversible motor mounted beneath said rear deck and within said automobile beneath said louver type blind, a laterally projecting oscillatable arm supported on and operated by said motor, a substantially vertical actuating rod extending through said rear deck and pivotally connected at its upper end to said tilt bar outwardly of the axial center thereof, a hinged bracket having openings through each of its hinged parts and arranged perpendicular to each other for slidably and adjustably securing said arm and said rod in the respective said openings, means energizing said motor, and switch means located convenient to the driver's seat of said automobile for reversibly controlling said motor.

CLIFFORD C. COFFMAN.

REFERENCES CITED

The following references are of record in the file of this patent:

UNITED STATES PATENTS

| Number | Name | Date |
|---|---|---|
| 44,072 | Burdick | Sept. 6, 1864 |
| 51,268 | Reed | Nov. 28, 1865 |
| 156,937 | Moffett | Nov. 17, 1874 |
| 1,695,064 | Schnoor | Dec. 11, 1928 |
| 1,890,827 | Pratt | Dec. 13, 1932 |
| 1,923,301 | Dunn | Aug. 22, 1933 |
| 1,977,844 | Blanchard | Oct. 23, 1934 |
| 2,149,481 | Van Bosch et al. | Mar. 7, 1939 |
| 2,159,696 | Gross | Mar. 23, 1939 |
| 2,430,970 | Albrecht | Nov. 18, 1947 |
| 2,464,387 | Foster | Mar. 15, 1949 |
| 2,565,979 | Michaelsen | Aug. 28, 1951 |

FOREIGN PATENTS

| Number | Country | Date |
|---|---|---|
| 326,838 | Germany | Mar. 14, 1919 |